United States Patent Office 3,318,917
Patented May 9, 1967

---

3,318,917
17α - (4 - ALKOXY - 3 - BUTEN - 1 - YNYL)ESTRA-1,3,5(10) - TRIENE - 3,17β - DIOLS AND DERIVATIVES THEREOF
Walter R. Benn, Deerfield, Ill., assignor to G. D. Searle & Co., Chicago, Ill., a corporation of Delaware
No Drawing. Filed Nov. 12, 1965, Ser. No. 507,555
8 Claims. (Cl. 260—397.1)

The present invention is concerned with novel steroidal derivatives characterized by a bis-unsaturated four carbon substituent at the 17-position and, more particularly, with 17α-(4-alkoxy-3-buten-1-ynyl)estra-1,3,5(10)-triene-3,17β-diols and derivatives thereof characterized by the following structural formula

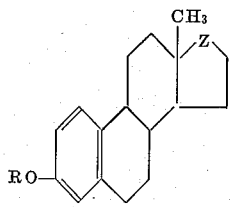

wherein R is a member of the class consisting of hydrogen and a lower alkyl radical, Z is a

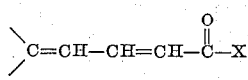

or

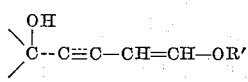

radical, X being a member of the class consisting of hydrogen and a hydroxy radical, R' being a lower alkyl radical and the dotted line indicating an unsaturated linkage selected from the group consisting of a double bond and a triple bond.

The lower alkyl radicals encompassed by R and R' in the foregoing formula are typified by methyl, ethyl propyl, butyl, pentyl, hexyl, heptyl and the branched-chain groups isomeric therewith.

The compounds of the present invention are suitably manufactured by utilizing as starting materials compounds of the following structural formula

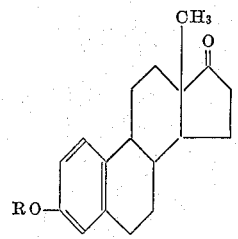

wherein R can be hydrogen or a lower alkyl radical. When a 17-ketone of the latter formula is contacted with a 1-alkoxy-1-buten-3-yne in the form of an appropriate organometallic derivative, the instant 17α-(4-alkoxy-3-buten-1-ynyl) substances are produced. As a specific example, 3-hydroxyestra-1,3,5(10)-trien-17-one is heated in a tetrahydrofuran-ether solution with 1-methoxy-1-buten-3-ynyl magnesium bromide, and the resulting adduct is hydrolyzed with aqueous ammonium chloride to produce 17α - (4-methoxy-3-butyn-1-ynyl)estra - 1,3,5(10)-triene-3,17β-diol.

Reduction of the acetylenic linkage of the latter derivatives is conveniently effected by reaction with a suitable reagent such as lithium aluminum hydride or lithium tri-(tertiary-butoxy) aluminum hydride. 17α-(4-methoxy-3-buten-1-ynyl)estra-1,3,5(10)-triene-3,17β-diol 3-methyl ether is thus heated in tetrahydrofuran solution with lithium aluminum hydride to afford 17α-(4-methoxybutadienyl)estra-1,3,5(10)-triene-3,17β-diol 3-methyl ether.

Hydrolysis of the aforementioned enol ethers results in the corresponding α,γ-bis-unsaturated aldehydes. 17α-(4-methoxybutadienyl)estra - 1,3,5(10)-triene-3,17β-diol 3-methyl ether, for example, in ethanol is contacted with dilute sulfuric acid to yield 17-(3-formylallyliden)estra-1,3,5(10)-trien-3-ol 3-methyl ether. The instant aldehydes are readily converted to the corresponding carboxylic acids by oxidation under mild conditions. A suitable procedure is exemplified by the reaction of 17-(3-formylallyliden)-estra-1,3,5(10)-trien-3-ol 3-methyl ether with silver oxide or cupric oxide to produce 17-(3-carboxyallyliden)-estra-1,3,5(10)-trien-3-ol 3-methyl ether.

An alternate procedure for manufacture of the instant 3-(lower alkoxy) compounds involves reaction of the corresponding 3-hydroxy substances with a suitable alkylating reagent such as a diazoalkane. That process is typified by the reaction of 17α-(4-methoxy-3-buten-1-ynyl)estra-1,3,5(10)-triene-3,17β-diol with an ethereal solution of diazomethane to yield the corresponding 3-methyl ether.

The compounds of this invention exhibit valuable pharmacological properties. They are hypocholesterolemic agents, for example, as is evidenced by their ability to decrease blood plasma cholesterol levels. They are, in addition, anti-hormonal agents in consequence of their anti-progestational and anti-fertility properties. They are, furthermore, anti-protozoal agents as is demonstrated by their ability to inhibit the growth of such organisms as *Tetrahymena gelleii*.

The following examples illustrate in further detail some of the compounds which constitute this invention together with the methods for their preparation. The invention however is not to be construed as limited thereby either in spirit or in scope as many modifications both in materials and methods can be adapted without departing from the invention herein described. In these examples temperatures are given in degrees centigrade (° C.) and quantities of materials in parts by weight unless otherwise noted.

EXAMPLE 1

To a solution of 9.02 parts of 1-methoxy-1-buten-3-yne in 90 parts of tetrahydrofuran is added, dropwise over a period of about 15 minutes, 37 parts by volume of 3 M ethereal ethyl magnesium bromide. After the initial exothermic reaction has subsided, the mixture is warmed to 40–50°, and a solution of 28.4 parts of 3-methoxyestra-1,3,5(10)-trien-17-one in 540 parts of tetrahydrofuran is added over a period of about 15 minutes, during which time the temperature is kept near reflux. After reaction at that temperature for about one hour, the mixture is allowed to cool to room temperature over a period of about one hour, then is cooled to about 10° and diluted carefully with 25 parts by volume of saturated aqueous ammonium chloride. The resulting two-phase system is stirred for about 15 minutes; the layers are separated, and the aqueous layer is extracted several times with ether. The combined organic solutions are washed several times with saturated aqueous ammonium chloride until neutral, then dried over a mixture of anhydrous sodium sulfate and anhydrous magnesium sulfate and stripped of solvent by distillation under reduced pressure. The resulting oily residue is dissolved in approximately 80 parts of methanol containing a trace of pyridine, then is concentrated to about ½ volume and cooled. The resulting crystalline mass is triturated with cold methanol containing a trace of pyridine to afford, as the hemimethanolate, 17α-(4-methoxy - 3 - buten-1-ynyl)estra-1,3,5(10)-triene-3,17β-diol 3-methyl ether, melting at about 70–79°. It displays ultraviolet absorption maxima at about 231 millimicrons with a molecular extinction coefficient of about 20,700, at about 278 millimicrons and about 287 millimicrons with a molecular extinction coefficient of about 1990. Nuclear magnetic resonance peaks are observed at about 53.5, 224.3, 226, 270, 276.5, 370.7, 377, 397.5 and 417 cycles per second. This compound is represented by the following structural formula

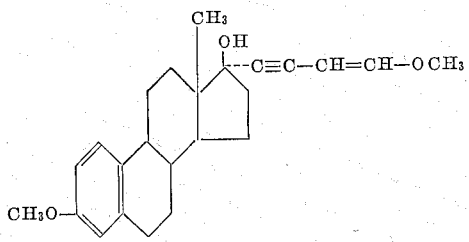

EXAMPLE 2

When an equivalent quantity of 3-hydroxyestra-1,3,5(10)-trien-17-one is substituted in the procedure of Example 1, there is produced, as the benzene solvate, 17α-(4-methoxy - 3 - buten - 1-ynyl)estra-1,3,5(10)-triene-3,17β-diol, melting at about 83° with decomposition. This compound exhibits an optical rotation of −15° and an ultraviolet absorption maximum at about 233 millimicrons with a molecular extinction coefficient of about 19,400. Nuclear magnetic resonance peaks are observed at about 53, 224, 271.5, 277.5, 328, 370.7, 377 and 440 cycles per second. This compound is represented by the following structural formula

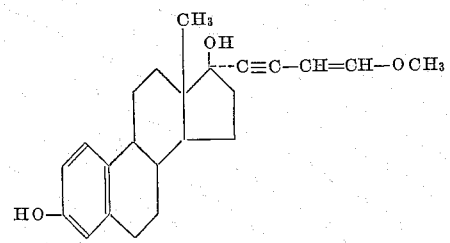

EXAMPLE 3

When an equivalent quantity of 3-ethoxyestra-1,3,5(10)-trien-17-one is substituted in the procedure of Example 1, there is obtained 17α-(4-methoxy-3-buten-1-ynyl)estra-1,3,5(10)-triene-3,17β-diol 3-ethyl ether.

EXAMPLE 4

When the procedure of Example 1 is repeated using an equivalent quantity of 1-ethoxy-1-buten-3-yne, there is obtained 17α - (4 - ethoxy-3-buten-1-ynyl)-estra - 1,3,5(10)-triene-3,17β-diol 3-methyl ether.

EXAMPLE 5

To a slurry of 4.5 parts of lithium aluminum hydride with 135 parts of tetrahydrofuran, under nitrogen, is added at room temperature with stirring, over a period of about 30 minutes, a solution of 10 parts of 17α-(4-methoxy - 3 - buten-1-ynyl)estra-1,3,5(10)-triene-3,17β-diol 3-methyl ether hemimethanolate in 90 parts of tetrahydrofuran. Stirring at that temperature is continued for about 30 minutes, after which time the mixture is heated at the reflux temperature for about one hour. The mixture is then cooled to room temperature and diluted successively with 11 parts of ethyl acetate and approximately 100 parts by volume of 10% aqueous potassium hydroxide. The resulting aqueous mixture is stirred for about 30 minutes, then is allowed to settle, and the layers are separated. The aqueous phase is extracted several times with ether, and the organic solutions are combined, washed with saturated aqueous sodium chloride, then dried over anhydrous sodium sulfate. A small quantity of pyridine is added, and the solution is concentrated to dryness under reduced pressure. Crystallization of the resulting gummy residue from methanol containing a small quantity of pyridine affords 17α-(4-methoxybutadienyl)estra-1,3,5(10)-triene-3,17β-diol 3-methyl ether, melting at about 136–138°. This compound exhibits ultraviolet absorption maxima at about 249 millimicrons with a molecular extinction coefficient of about 25,250, at about 277 millimicrons and at about 287 millimicrons with a molecular extinction coefficient of about 1830. It displays also infrared absorption peaks at about 2.82, 6.05, 6.21, 6.32, 6.64, 6.80 and 9.16 microns and nuclear magnetic resonance maxima at about 56, 95, 219.5, 222.5, 297, 303.5, 308, 314, 339, 350, 379, 390, 355 and 357 cycles per second. It is represented by the following structural formula

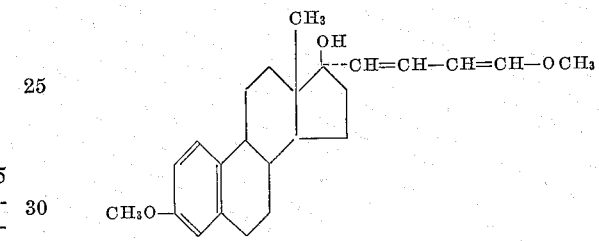

EXAMPLE 6

The substitution of an equivalent quantity of 17α-(4-methoxy - 3 - buten - 1-ynyl)estra-1,3,5(10)-triene-3,17β-diol in the procedure of Example 5 results in 17α-(4-methoxybutadienyl)estra-1,3,5(10)-triene-3,17β-diol.

EXAMPLE 7

By substituting an equivalent quantity of 17α-(4-methoxy - 3 - buten-1-ynyl)estra-1,3,5(10)-triene-3,17β-diol 3-ethyl ether and otherwise proceeding according to the processes described in Example 5, there is produced 17α-(4 - methoxybutadienyl)estra-1,3,5(10)-triene-3,17β - diol 3-ethyl ether.

EXAMPLE 8

The substitution of an equivalent quantity of 17α-(4-ethoxy-3-buten-1-ynyl)estra-1,3,5(10)-triene-3,17β-diol 3-methyl ether in the procedure of Example 5 results in 17α - (4 - ethoxybutadienyl)estra-1,3,5(10)-triene-3,17β-diol 3-methyl ether.

EXAMPLE 9

To a solution of 2 parts of 17α-(4-methoxybutadienyl) estra-1,3,5(10)-triene-3,17β-diol 3-methyl ether in 80 parts of ethanol is added a solution of 2.76 parts of concentrated sulfuric acid in 5 parts of water, and the resulting clear yellow solution is stirred at room temperature for about one hour. At the end of that time, saturated aqueous sodium carbonate is added dropwise to the point of neutrality, and the solution is diluted with approximately 200 parts of water. The precipitate which forms is collected by filtration, washed with water and dried over potassium hydroxide to afford the crude product, melting at about 105–120°. Purification by recrystallization from either methylcyclohexane-ether or methylcyclohexane-ethyl acetate yields pure 17-(3-formylallyliden)estra-1,3,5(10)-trien-3-ol 3-methyl ether, melting at about 125–127°. This compound exhibits an optical rotation of +19°, an ultraviolet absorption maximum at 288–293 millimicrons with a molecular extinction coefficient of about 35,800, infrared absorption maxima at about 3.61, 5.94, 6.09 and 6.19 microns and nuclear magnetic resonance peaks at about 52.5, 225.5, 351, 355, 359, 367, 370, 375, 398, 416, 436, 568.5, and 576.5 cycles per second. It is represented by the following structural formula

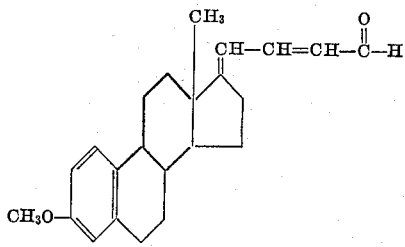

EXAMPLE 10

When an equivalent quantity of 17α-(4-methoxybutadienyl)estra-1,3,5(10)-triene-3,17β-diol is substituted in the procedure of Example 9, there is produced 17-(3-formylallyliden)estra-1,3,5(10)-trien-3-ol.

EXAMPLE 11

By substituting an equivalent quantity of 17α-(4-methoxybutadienyl)estra - 1,3,5(10)-triene-3,17β-diol 3-ethyl ether and otherwise proceeding according to the processes described in Example 9, there is produced 17-(3-formylallyliden)estra-1,3,5(10)-trien-3-ol 3-ethyl ether.

EXAMPLE 12

To a solution of 0.73 part of 17(3-formylallyliden)estra-1,3,5(10)-trien-3-ol 3-methyl ether and 0.85 part of silver nitrate in 24 parts of ethanol containing 18 parts of tetrahydrofuran and 20 parts of water is added dropwise with stirring a solution of 0.3 part of sodium hydroxide in 5 parts of water. The resulting slurry containing precipitated silver oxide is stirred vigorously at room temperature for about 8 hours, then is filtered in order to remove the silver salts. The filtrate is made slightly acidic by means of dilute hydrochloric acid, then is concentrated to approximately ½ volume by distillation under reduced pressure. The white precipitate which forms is collected by filtration and dried to afford the crude product, melting at about 100–125°. Recrystallization from ethyl acetate affords pure 17-(3-carboxyallyliden)estra-1,3,5(10)-trien-3-ol 3-methyl ether, melting at about 204–207°.

It exhibits ultraviolet absorption maxima at about 230 and 276.5 millimicrons with molecular extinction coefficients of about 7,800 and 32,800, respectively, infrared absorption peaks at about 3.7–3.9, 5.92, 6.10 and 6.21 microns and nuclear magnetic resonance peaks at about 51.5, 226, 339, 349, 354, 362, 398, 417, 442, 453, 458, 468 and 674 cycles per second. This compound is represented by the following structural formula

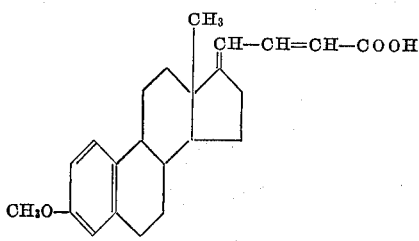

EXAMPLE 13

When an equivalent quantity of 17-(3-formylallyliden)estra-1,3,5(10)-trien-3-ol is substituted in the procedure of Example 12, there is produced 17-(3-carboxyallyliden)estra-1,3,5(10)-trien-3-ol.

EXAMPLE 14

By substituting an equivalent quantity of 17(3-formylallyliden)estra-1,3,5(10)-trien-3-ol 3-ethyl ether in the procedure of Example 12, there is obtained 17-(3-carboxyallyliden)estra-1,3,5(10)-trien-3-ol 3-ethyl ether.

What is claimed is:
1. A compound of the formula

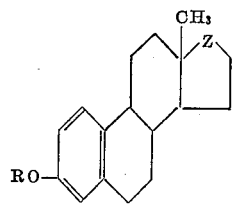

wherein R is a member of the class consisting of hydrogen and a lower alkyl radical, Z is selected from the group consisting of $$>C=CH-CH=CH-\overset{O}{\underset{\|}{C}}-X \quad \text{and} \quad >\overset{OH}{\underset{|}{C}}-C\equiv C-CH=CH-OR'$$

radicals, X being a member of the class consisting of hydrogen and a hydroxy radical, R' being a lower alkyl radical and the dotted line indicating an unsaturated linkage selected from the group consisting of a double bond and a triple bond.

2. As in claim 1, a compound of the formula

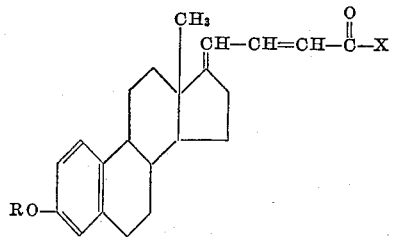

wherein X is a member of the class consisting of hydrogen and a hydroxy radical and R is selected from the group consisting of hydrogen and a lower alkyl radical.

3. As in claim 1, a compound of the formula

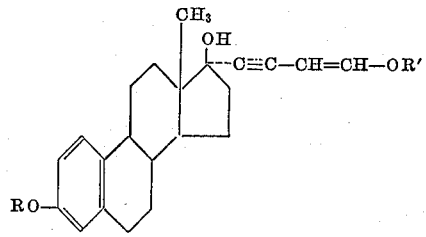

wherein R is selected from the group consisting of hydrogen and a hydroxy radical, R' is a lower alkyl radical and the dotted line indicates an unsaturated linkage selected from the group consisting of a double bond and a triple bond.

4. As in claim 1, the compound which is 17-(3-formylallyliden)estra-1,3,5(10)-trien-3-ol 3-methyl ether.

5. As in claim 1, the compound which is 17-(3-carboxyallyliden)estra-1,3,5(10)-trien-3-ol 3-methyl ether.

6. As in claim 1, the compound which is 17α-(4-methoxybutadienyl)estra-1,3,5(10)-triene-3,17β-diol 3-methyl ether.

7. As in claim 1, the compound which is 17α-(4-methoxy - 3 - buten-1-ynyl)estra-1,3,5(10)-triene-3,17β-diol 3-methyl ether.

8. As in claim 1, the compound which is 17α-(4-methoxy-3-buten-1-ynyl)estra-1,3,5(10)-triene-3,17β-diol.

References Cited by the Examiner

UNITED STATES PATENTS 3,265,718   8/1966   Christiansen _____ 260—397.5

LEWIS GOTTS, *Primary Examiner.*

THOMAS M. MESHBESHER, *Assistant Examiner.*